United States Patent
Biondi

(10) Patent No.: US 10,448,245 B2
(45) Date of Patent: Oct. 15, 2019

(54) MOBILE DEVICE FOR STORING DIGITAL DATA

(71) Applicant: AIRBUS GROUP SAS, Blagnac (FR)

(72) Inventor: Philippe Biondi, Saint-Cloud (FR)

(73) Assignee: AIRBUS SAS, Blagnac (FR)

( * ) Notice: Subject to any disclaimer, the term of this patent is extended or adjusted under 35 U.S.C. 154(b) by 661 days.

(21) Appl. No.: 15/107,933

(22) PCT Filed: Dec. 19, 2014

(86) PCT No.: PCT/EP2014/078871
§ 371 (c)(1),
(2) Date: Jun. 24, 2016

(87) PCT Pub. No.: WO2015/101532
PCT Pub. Date: Jul. 9, 2015

(65) Prior Publication Data
US 2016/0330621 A1   Nov. 10, 2016

(30) Foreign Application Priority Data

Dec. 30, 2013   (FR) ..................................... 13 63668

(51) Int. Cl.
*H04W 12/06* (2009.01)
*G06F 21/62* (2013.01)
(Continued)

(52) U.S. Cl.
CPC .......... *H04W 12/06* (2013.01); *G06F 3/0604* (2013.01); *G06F 3/067* (2013.01); *G06F 3/0653* (2013.01); *G06F 13/4282* (2013.01); *G06F 21/62* (2013.01); *G06F 21/6218* (2013.01); *H04L 63/0853* (2013.01); *H04L 63/0861* (2013.01);
(Continued)

(58) Field of Classification Search
CPC ..... H04W 12/06; H04W 12/00; G06F 3/0604; G06F 3/0653; G06F 3/067; G06F 13/4282; G06F 21/6218; G06F 2221/2149; G06F 2221/2143; G06F 3/00; G06F 3/06;
(Continued)

(56) References Cited

U.S. PATENT DOCUMENTS 8,566,599 B2 * 10/2013 Bhangi .................. G06F 21/34
713/182
2006/0095433 A1 * 5/2006 Kano .................. G06F 21/6218
(Continued)

FOREIGN PATENT DOCUMENTS

WO    2011/099853 A1   8/2011

OTHER PUBLICATIONS

International Search Report, dated Mar. 17, 2015, from corresponding PCT application.

*Primary Examiner* — Jayesh M Jhaveri
(74) *Attorney, Agent, or Firm* — Young & Thompson

(57) ABSTRACT

A mobile device (10) capable of storing digital data, includes a storage space (11), and elements for: providing a partial view of the storage space (11) when the content of the storage space is viewed during the connection of the device (10) to a second device (20); and providing an overall view of the storage space (11) when the content of the storage space (11) is viewed during the connection of the device (10) to a second device (20), and when an authorized user of the device (10) performs an authentication with the device (10).

14 Claims, 2 Drawing Sheets

(51) Int. Cl.
*H04L 29/06* (2006.01)
*G06F 13/42* (2006.01)
*G06F 3/06* (2006.01)
*H04L 12/00* (2006.01)
*H04W 12/00* (2009.01)

(52) U.S. Cl.
CPC ........... *G06F 2221/2129* (2013.01); *G06F 2221/2143* (2013.01); *G06F 2221/2149* (2013.01); *H04W 12/00* (2013.01)

(58) Field of Classification Search
CPC ..... G06F 21/62; G06F 13/42; H04L 63/0853; H04L 63/0861; H04L 29/06; H04L 63/08
See application file for complete search history.

(56) References Cited

U.S. PATENT DOCUMENTS

| | | | |
|---|---|---|---|
| 2010/0161928 A1* | 6/2010 | Sela | G06F 12/1441 |
| | | | 711/163 |
| 2010/0232653 A1 | 9/2010 | Muquit et al. | |
| 2010/0241868 A1 | 9/2010 | Nachef et al. | |
| 2012/0072731 A1* | 3/2012 | Winograd | G06F 21/10 |
| | | | 713/176 |
| 2013/0314208 A1* | 11/2013 | Risheq | G07C 9/00158 |
| | | | 340/5.53 |

* cited by examiner

MOBILE DEVICE FOR STORING DIGITAL DATA

FIELD OF THE INVENTION

The present invention pertains to the field of Information Technologies, and especially to the field of devices for storing digital data.

Within the framework of the present invention, it is sought to design storage devices (for example: USB ("Universal Serial Bus") key, external hard disk, mobile telephone, storage media readers, etc.) for digital data so as to eliminate the risks of information theft or of compromise when said device is used as a medium for exchanging information.

PRIOR ART

Frequently, often during meetings, certain people want to transmit documents to other people. The means generally adopted consists in using a USB key which is shared between the "source people" and the "destination people".

Several security problems arise here, especially when the various participants do not belong to the same entities:
- It is possible for all the people to whom the key does not belong to retrieve the present content of the key, and probably the past contents if they have not been erased in a secure manner;
- It is possible for one of the people via whom the key will travel to contaminate the files transmitted for those who follow;
- It is possible for the owner of the key to infect, deliberately or accidentally, all the people who will plug in this key.

In the majority of cases, the problems mentioned hereinabove are ignored, despite their existence and their potential seriousness.

Cautious people make provision to format their USB key, but mere formatting does not generally suffice to completely erase any trace of the past contents.

The people who are strictest in this matter use a multitude of USB keys, for each use and level of sensitivity.

DISCLOSURE OF THE INVENTION

The present invention intends to remedy the drawbacks of the prior art by proposing a device making it possible to offer different views of the storage space as a function of the user of the device.

For this purpose, the present invention relates, in its most general acceptation, to a mobile device able to store digital data, comprising a storage space, characterized in that it comprises means for:
- Providing a partial view of said storage space when the content of said storage space is viewed when connecting said device to a second device; and
- Providing an overall view of said storage space when the content of said storage space is viewed when connecting said device to a second device, and when an authorized user of said device carries out an authentication with said device.

According to one embodiment, said device comprises a host storage space, an onboard sub-system able to simulate a storage space on a bus on the basis of said host storage space, and authentication means.

According to one embodiment, said host storage space is included within the following group: flash memory, hard disk and mobile phone.

According to one embodiment, said bus is a bus of USB ("Universal Serial Bus"), "Firewire" (in accordance with standard IEEE 1394) or "Thunderbolt" type.

According to one embodiment, said authentication means are included within the following group: digital keypad, fingerprint reader, communication on said bus, identification of the computer, and application using the user interface (keypad/screen) of a mobile phone.

Advantageously, said device furthermore comprises configuration means so as to be able to carry out configuration adjustments.

According to a variant, said configuration means take the form of in-band communication on said bus.

According to another variant, said configuration means take the form of out-of-band communication on said bus.

According to a particular mode of implementation, the data stored in said device are encrypted by virtue of encryption means.

BRIEF DESCRIPTION OF THE DRAWINGS

The invention will be better understood with the aid of the description, given hereinafter purely by way of explanation, of an embodiment of the invention, with reference to the Figures in which.

DETAILED DESCRIPTION OF THE EMBODIMENTS OF THE INVENTION

Figure 1:
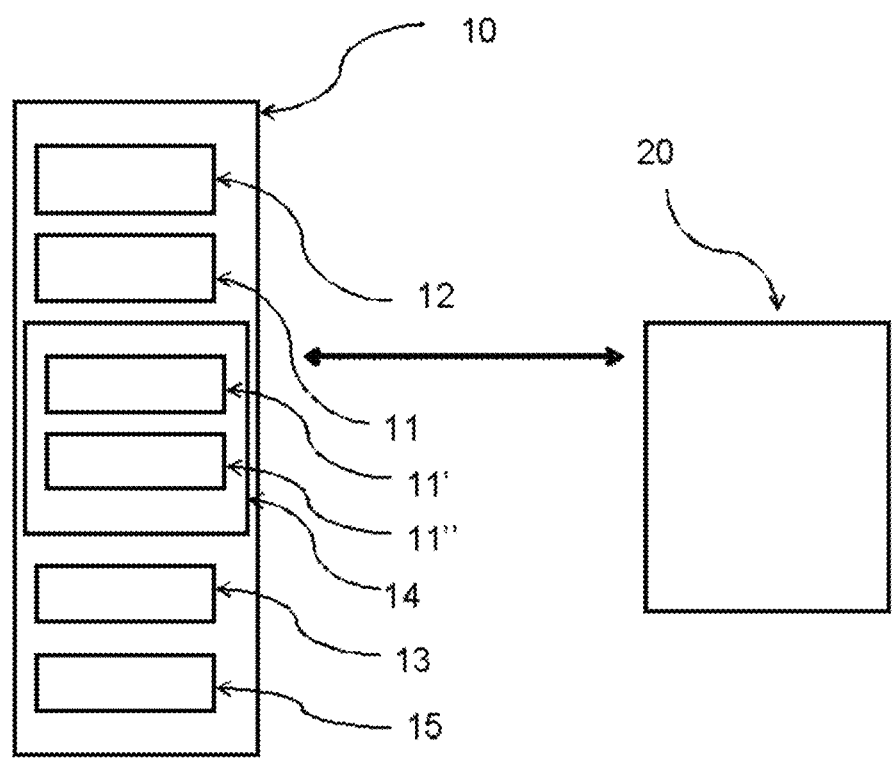
FIG. 1 illustrates the device according to the present invention in an embodiment.

The mobile device 10 able to store digital data according to the present invention comprises a storage space 11, and comprises means for:
- Providing a partial view of said storage space 11 when the content of said storage space 11 is viewed when connecting said device 10 to a second device 20; and
- Providing an overall view of said storage space 11 when the content of said storage space 11 is viewed when connecting said device 10 to a second device 20, and when an authorized user of said device 10 carries out an authentication with said device 10.

The device 10 according to the present invention comprises:
- a host storage space 11 (flash memory, hard disk);
- an onboard sub-system 12 capable of simulating a storage space 11' on a bus 14 (USB, Firewire or IEEE 1394, Thunderbolt, etc.) on the basis of the host storage space 11; and
- authentication means 13 (digital keypad, fingerprint reader, communication on the bus, identification of the computer, etc.).

In one embodiment, another storage space 11" is simulated on said bus 14.

In one embodiment, the device 10 according to the present invention comprises configuration means 15 so as to be able to perform configuration adjustments, for example adjust the size of the guest spaces or the model to be used for these spaces. These configuration means 15 can take the form of in-band or out-of-band communications on the bus.

FIG. 1 illustrates the device according to the present invention in an embodiment: depicted in FIG. 1 is the device 10 comprising a host storage space 11 and a simulated storage space 11'. Another simulated storage space 11" is represented in FIG. 1.

FIG. 1 also represents the onboard sub-system 12 capable of simulating a storage space 11' on a bus 14 (USB, Firewire or IEEE 1394, Thunderbolt, etc.) on the basis of the host storage space 11.

FIG. 1 also represents the authentication means 13, the bus 14 and the configuration means 15.

FIG. 1 also shows the second device 20 to which the device 10 is connected.

Figure 2A:
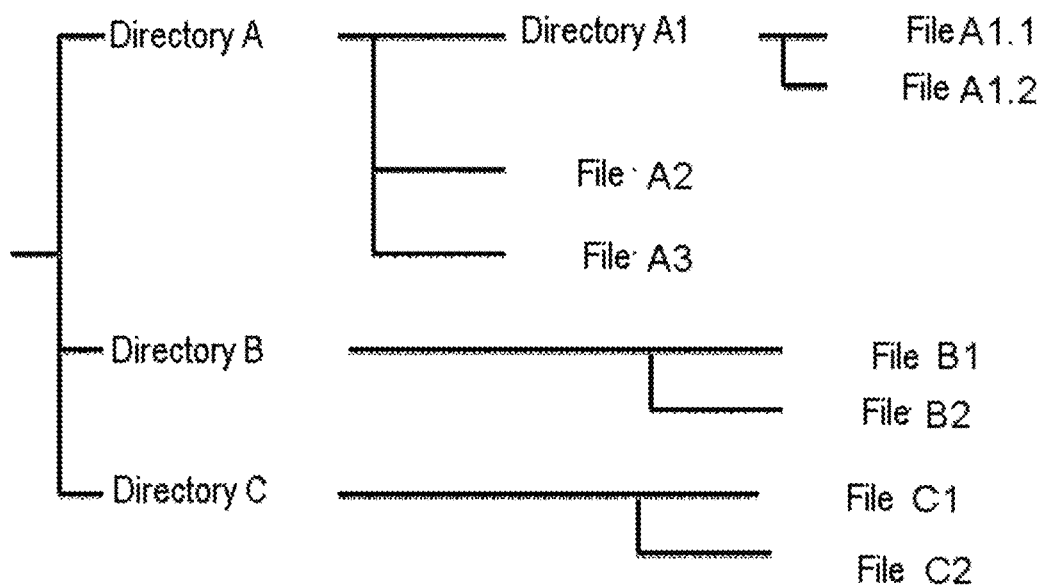
FIG. 2a represents an overall view of the storage space within the meaning of the present invention.
Figure 2B:
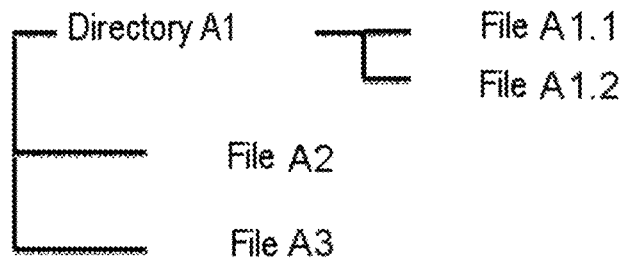
FIG. 2b represents a partial view of the storage space within the meaning of the present invention.

FIG. 2a represents an overall view of the storage space 11 within the meaning of the present invention, and FIG. 2b represents a partial view of the storage space 11 within the meaning of the present invention.

Depicted in FIG. 2a is a file system tree comprising three directories A, B and C. Directory A comprises a sub-directory A1 and two files A2 and A3. The sub-directory A1 itself comprises two files A1.1 and A1.2. Directory B comprises two files B1 and B2, and directory C comprises two files C1 and C2. This is an overall view of the storage space 11 within the meaning of the present invention.

Depicted in FIG. 2b is a file system tree comprising a sub-directory A1, two files A1.1 and A1.2 of this sub-directory, and two other files A2 and A3. Directories B and C and the corresponding files do not appear in this view, which is a partial view of the storage space 11 within the meaning of the present invention.

Thus, when the owner of the device 10 according to the present invention plugs the latter into his computer, he authenticates himself therewith and thus accesses all the guest storage spaces. He can consult them, erase them. He can also modify, erase or create a new model and choose which of the existing models will be used when plugging in the next few times. During the creation of a new model, the device 10 according to the present invention will be able to take care to clean the host storage areas that it reckons to use so that information leakage stemming from the reallocation of previously used and then released storages areas is rendered impossible. It could finally configure the name generated for each guest storage space created (for example {name of the model}-{date of creation}), or decide whether the unmodified guest spaces are preserved or destroyed. The keeping of an event log is also envisaged. All these operations can be performed directly on the basis of system tools (file explorer, serial terminal, etc.) or through an ad hoc application offering a user interface.

When the device 10 is used subsequently by a person, the latter will see only a clone of the active model. None of the other documents is accessible even when an attempt is made to retrieve the entire disk.

II will be able to retrieve the documents that may already be present there because the owner will have placed them in the model. A copy-on-write mechanism will make it possible to consume only the space actually necessary in the host storage space when creating multiple guest areas.

In one embodiment, the data stored in said device 10 are encrypted by virtue of encryption means.

Anyone apt to exchange documents with the aid of a physical medium will be interested in the possibility of doing so by means of the device 10 according to the present invention without having to trust his interlocutor, without running the risk of information leakage, and without running the risk of exposing his interlocutor to previous infections of the device.

The invention is described in the foregoing by way of example. It is understood that the person skilled in the art is able to carry out various alternatives of the invention without, however, departing from the scope of the patent.

The invention claimed is:

1. A mobile device that stores digital data, comprising:
   a data storage space;
   an interface that connects the mobile device to a second device;
   means, stored in the data storage space, for providing an overall view of all files and any accompanying directories stored in said storage space to the second device when said mobile device is connected via said interface to the second device, on condition that an authorized user of said mobile device carries out an authentication with said mobile device; and
   means, stored in the data storage space, for providing, when said mobile device is connected via said interface to the second device and the authorized user has not carried out the authentication with said mobile device, a view of a guest storage space that simulates a partial view of said storage space and that consists of a sub-set of said files and any accompanying directories of said storage space, while preventing access by said second device from said overall view,
   the sub-set of said files and any accompanying directories of the partial view being selected in accordance with a model created by the authorized user, said model stored on the mobile device and identifying said files and any accompanying directories of the partial view made available via the guest storage space.

2. The mobile device as claimed in claim 1, further comprising:
   an onboard sub-system, stored in the data storage space that simulates one or more guest storage spaces on a data bus; and
   authentication means for authenticating the authorized user with said mobile device.

3. The mobile device as claimed in claim 2, wherein said host storage space is one selected from the group consisting of: flash memory, a hard disk, and a mobile phone.

4. The mobile device as claimed in claim 2, wherein said authentication means is at least one selected from the group consisting of: a digital keypad, a fingerprint reader, a communication on said bus, an identification of the computer, and an application using a user interface of a mobile phone, said user interface being either of a keypad of the mobile phone or a screen of the mobile phone.

5. The mobile device as claimed in claim 2, further comprising:
   configuration means, stored in the data storage space, that carries out configuration adjustments.

6. The mobile device as claimed in claim 1, further comprising:
   encryption means, stored in the data storage space, that encrypts data stored in said mobile device.

7. The mobile device as claimed in claim 3, wherein said authentication means is at least one selected from the group consisting of: a digital keypad, a fingerprint reader, a communication on said bus, an identification of the computer, and an application using a user interface of a mobile phone, said user interface being either of a keypad of the mobile phone or a screen of the mobile phone.

8. The mobile device as claimed in claim 1, further comprising:
   configuration means, stored in the data storage space, that carries out configuration adjustments.

9. The mobile device as claimed in claim 2, wherein data stored in said mobile device are encrypted by virtue of encryption means.

10. The mobile device as claimed in claim 1, wherein said guest storage space is separate from said storage space.

11. The mobile device as claimed in claim 1, wherein said guest storage space is managed separately from the storage space by means of the model.

12. The mobile device as claimed in claim 1, further comprising:
   configuration means, stored in the data storage space, that, for the authorized user who has carried out the authentication with said mobile device, does any of create, modify, and destroy one or more models for making one or more sub-sets of said files and any accompanying directories stored in said storage space available in one or more guest storage spaces.

13. The mobile device as claimed in claim 12, wherein the configuration means, for the authorized user who has carried out the authentication with said mobile device, does any of create, destroy, and modify a size of the one or more guest storage space.

14. The mobile device as claimed in claim 12, wherein the sub-set of said files and any accompanying directories of the partial view is made available by the model to a non-authorized user from the storage space via a copy-on-write mechanism operating on the mobile device.

* * * * *